United States Patent
Singh

(10) Patent No.: US 7,272,498 B2
(45) Date of Patent: Sep. 18, 2007

(54) METHOD FOR INCORPORATING IMAGES WITH A USER PERSPECTIVE IN NAVIGATION

(75) Inventor: Mona Singh, Cary, NC (US)

(73) Assignee: Scenera Technologies, LLC, Portsmouth, NH (US)

(*) Notice: Subject to any disclaimer, the term of this patent is extended or adjusted under 35 U.S.C. 154(b) by 321 days.

(21) Appl. No.: 10/954,442

(22) Filed: Sep. 30, 2004

(65) Prior Publication Data

US 2007/0198182 A1    Aug. 23, 2007

(51) Int. Cl.
*G01C 21/26* (2006.01)

(52) U.S. Cl. .................. 701/211; 701/208; 701/28; 340/995.19

(58) Field of Classification Search ........ 701/200–202, 701/211, 213, 24, 28, 208; 348/148; 340/988, 340/990, 991, 995.1, 995.19; 342/357.09
See application file for complete search history.

(56) References Cited

U.S. PATENT DOCUMENTS

| 6,088,717 A | * | 7/2000 | Reed et al. | ........... 709/201 |
| 6,810,323 B1 | * | 10/2004 | Bullock et al. | ........... 701/206 |
| 7,110,592 B2 | * | 9/2006 | Kotake et al. | ........... 382/154 |

FOREIGN PATENT DOCUMENTS

WO    WO 01/46781    6/2001

* cited by examiner

*Primary Examiner*—Y. Beaulieu

(57) ABSTRACT

An image-based navigation method and system are provided. In response to a user request submitted to a navigation system, the image-based navigation system provides directions to the user, wherein the directions include one or more route segments, and at least one digital image of a view along at least one of the route segments. In a further aspect, the directions are provided to the user by displaying a map of the route along with the route segments, wherein when each of the route segments is displayed, any images associated with the corresponding route segment are also displayed.

29 Claims, 6 Drawing Sheets

METHOD FOR INCORPORATING IMAGES WITH A USER PERSPECTIVE IN NAVIGATION

FIELD OF THE INVENTION

The present invention relates to digital images, and more particularly to a method of incorporating digital images taken by the public into navigation systems for display when providing directions.

BACKGROUND OF THE INVENTION

Navigation systems are becoming increasingly common. Most navigation systems are GPS-based (Global Positioning System). By triangulation of signals from three of the satellites, a GPS receiving unit can pinpoint its current location anywhere on earth to within 20 meters horizontally. Today, in-the-dash GPS-based navigation systems are standard or at least an option in luxury cars and third-party systems are also available for all cars. Most systems use a DVD, CD-ROM or hard disk that reads digital maps to guide the driver to a destination city or street address. They can even take the user to the nearest gas station, hotel, restaurant and many other points of interest. In addition to in-car navigation systems, there are handheld GPS units, and GPS-equipped cellphones and PDAs.

Today, telematics, which refers to the convergence of telecommunications and information processing, especially automation in automobiles, is a major growth area. Telematics includes GPS navigation, integrated hands-free cellphones, and wireless communications. Telematics enables a variety of integrated systems, including a wireless standard for vehicles called Dedicated Short Range Communications (DSRC) that is based on a modified 802.11a technology. In addition, Bluetooth wireless technology is being explored to interface a driver's cellphone and PDA into the vehicle's audio system, such that drivers can ask their cars to look up a number or address, and the car would dial the number or provide directions to get there.

Regardless of the implementation, the operation of navigation systems can be summed up as follows: 1) a user submits a request for directions by providing start and end points in the form of city names or street addresses; 2) the navigation system provides a map with turn-by-turn directions and optionally provides directions to several nearby points of interest; and 3) the user can zoom in and out of maps to see more or less detail.

FIG. 1 is a block diagram of an example map displayed by a conventional navigation system. In general, the user inputs an address and in response receives directions to the destination as an aerial map that outlines street names, as shown. The navigation system may also provide text and/or audio directions for each segment of the route, e.g., "Turn right on 22nd St. N.W." In some cases advertisers may include logos to indicate their location with respect to the aerial map.

Although current navigation systems work well for their intended purpose, state-of-the-art navigation systems do not capture the user's perspective in navigation, most of whom navigate the world largely based on landmarks and other visual clues. Very often, people are unable to give directions to places they visit quite often because they simply "know how to get there" without explicitly knowing the street names. People are able to naturally navigate their way because they have mental images of turns, corners, and buildings encountered along the route. Conventional navigation systems provide a view that does not mesh with the way people think.

Accordingly, what is needed is an improved method and system for providing directions using GPS navigation systems. The present invention addresses such a need.

BRIEF SUMMARY OF THE INVENTION

The present invention provides an image-based navigation system and method. In response to a user request submitted to a navigation system, the image-based navigation system provides directions to the user, wherein the directions include one or more route segments, and at least one digital image of a view along at least one of the route segments to aid in user navigation. In a further aspect, the directions are provided to the user by displaying a map of the route along with the route segments, wherein when each of the route segments is displayed, any images associated with the corresponding route segment are also displayed.

According to the method and system disclosed herein, the present invention provides a user aid to navigation that corresponds to the way people think and provide directions to each other—through visualization of the route.

DETAILED DESCRIPTION OF THE INVENTION

The present invention relates to the use of digital images in navigation systems. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

The present invention provides a user interface for navigation systems that more directly corresponds to a user's natural way of navigation. The present invention provides an image based navigation system that incorporates digital images by displaying images of scenes encountered along the route to aid in user navigation. Preferably, the digital images incorporated into the navigation system are taken by users at street level and associated with the location at which they were taken. In response to a user request for directions, the map and directions are provided to the user along with representative images of views along the route. Since people would have taken these images, they would be more useful than just maps—e.g., they would likely be from an eye-level perspective. Further, the images help identify the point of interest within a geographical local that one is navigating toward.

Figure 1:
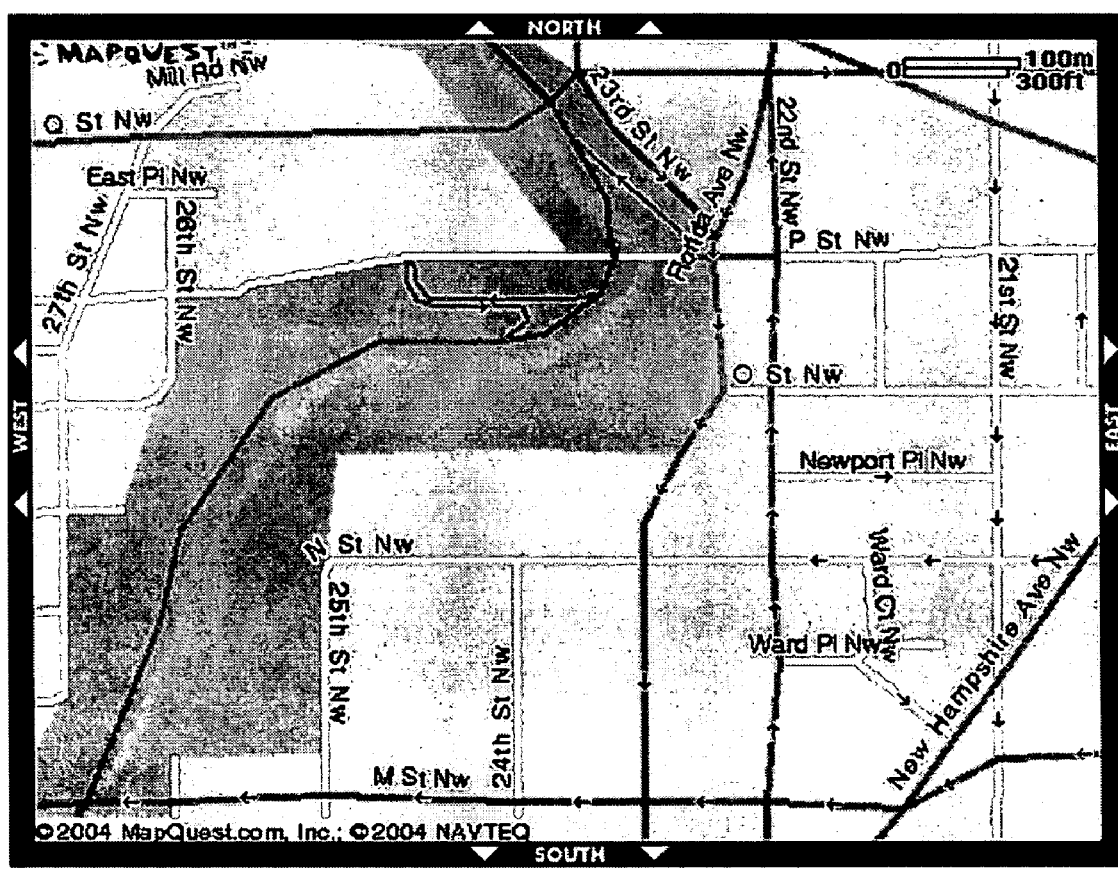
FIG. 1 is a block diagram of an example map displayed by a conventional navigation system.
Figure 2:
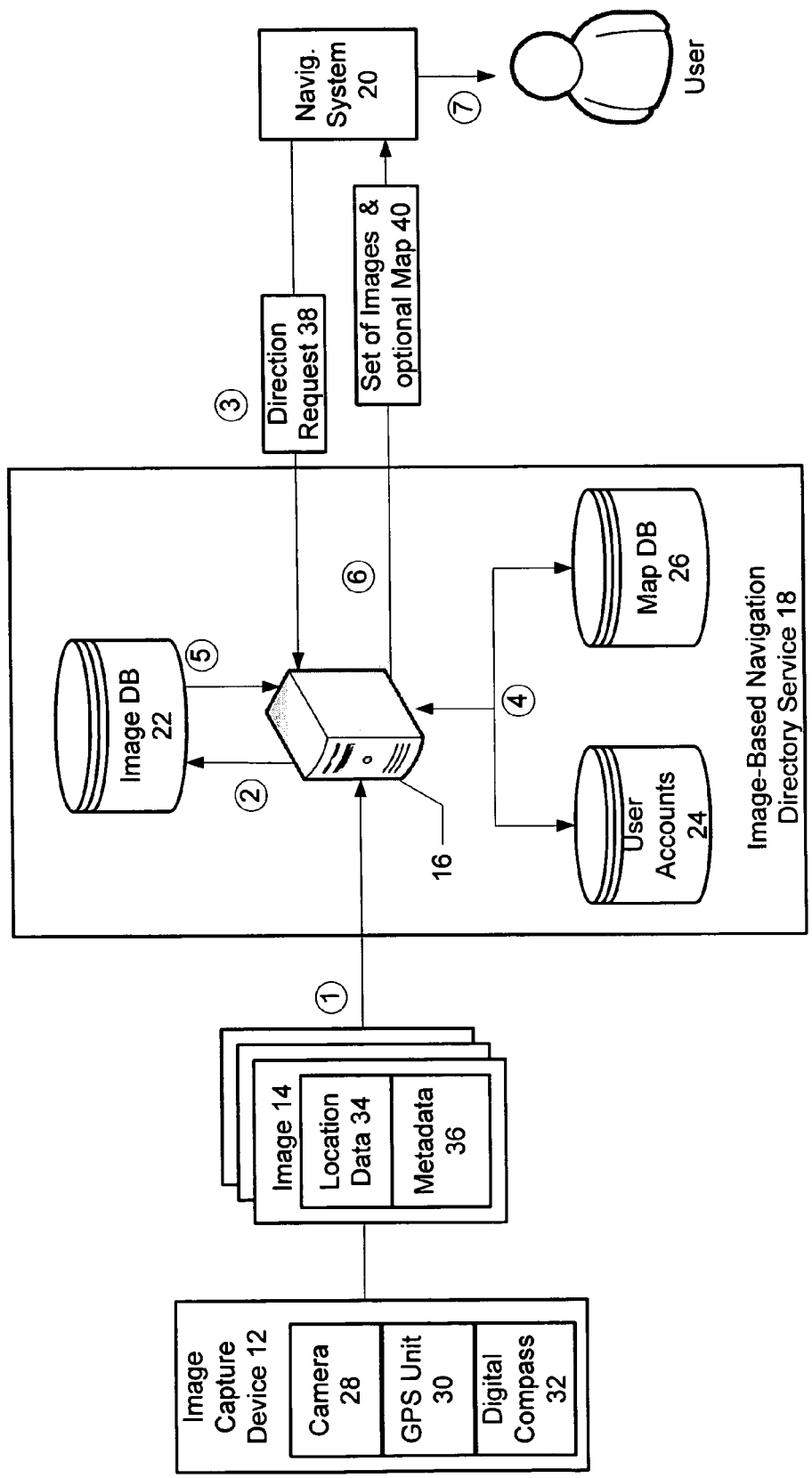
FIG. 2 is a block diagram illustrating an image-based navigation system in a preferred embodiment of the present invention.

FIG. 2 is a block diagram illustrating an image-based navigation system in a preferred embodiment of the present invention. The image-based navigation system 10 includes image capture devices 12 that capture digital images 14, and an online, image-based navigation directory service 18 that provides maps and directions to a user's navigation system 20. The navigation directory service 18 includes a server 16, an image database 22 for storing the digital images 14, a user accounts database 24 for storing user account information, and a map database 26 for storing map and direction data. The image capture devices 12 include a camera system 28 for capturing images 14, and in a preferred embodiment, also include a GPS unit 30 and an optional digital compass 32. The image capture devices 12 may be implemented as a camera phone, a conventional or wireless digital camera, a camcorder, or a camera-equipped PDA. Accordingly, the digital images 14 may include digital still images and video clips.

In a preferred embodiment, the navigation system 20 is incorporated into an automobile navigation system. However, as described herein, the navigation system may be incorporated into a user's cellphone or PDA. In addition, the navigation system 20 may represent a user's PC in which maps and images along the route are downloaded from the navigation directory service 18 to the PC over the Internet.

The process for providing image-based navigation begins in step 1 when entities such as the general public, businesses, or the government use image capture devices 12 to capture images of scenes along or nearby roadways, such as at intersections, businesses, and scenic views, for instance, and upload the images 14 to a server 16 of the navigation directory service 18. In a preferred embodiment, the owners of the image capture devices 12 must first subscribe to the navigation directory service 18 in order to upload images 14 to the server 16. The digital images 14 may be uploaded to the server 16 directly from the devices 12, or through an intermediate device such as a PC.

In a preferred embodiment, each of the uploaded images 14 is tagged with location data 34 and metadata 36. The location data 34 specifies the geographical coordinates of where the image 14 was captured. The metadata 36 includes the time and date of the image capture and user annotations in the form of text or audio describing what is shown in the image 14. The location data 34 is preferably in the form of GPS data provided by the GPS unit 28. The location data 32 further includes a heading that indicates the direction of view of the image (e.g., N, NE, E, SE, S, SW, W, NW). The heading for the image is the direction that the image capture unit was pointing at the time of image capture and may be obtained from the digital compass 32. In an alternative embodiment for devices 12 that are not equipped with the GPS unit 34, or where GPS data is otherwise unavailable, the location data 34 may be manually entered by the user of the device 12 in the form of a street address and direction of the view (N, NE, E, SE, S, SW, W, NW).

Once the images 14 are uploaded, in step 2 the server 16 stores the images 14 in an image database 22, which is indexed by the location data.

In step 3, a user of the navigation system 20 logs into the directory service 18 using a log in/password and submits a request for directions 38 to the navigation system 20, and the navigation system 20 wirelessly transmits the request 38 to the server 16. As is well-known in the art, the request for directions 38 entered by the user includes a starting address and a destination address, and in a preferred embodiment, further includes the navigation system's 20 current heading. In one preferred embodiment, the navigation directory service 18 accesses the user account database 24 to validate the user prior to rendering services, and may charge the user a monthly or per use fee for the image-based navigation service.

In step 4, the server 16 may retrieve any user preferences associated with the user's account from the user account database 24 and accesses the map database 26 to calculate directions given the starting and destination addresses in the request 38. The directions comprise a set of turn-by-turn instructions which may be provided in text or audio format. As used herein, each turn-by-turn instruction is referred to as a segment along the route. For each segment identified along the route, the server 16 in step 5 searches the image database 22 for any images 14 that have location data 34 that matches the location of the segment. In step 6, the server 16 transmits the set of images 40 found for the directions to the navigation system 24.

In step 7, the navigation system 20 displays a map of the route along with any images 14 associated with the route segment, thereby providing navigation assisted with images of scenes along the way, which is highly user centric. Either the server 16 or the navigation system so it may calculate the map and directions that are displayed to the user. In a preferred embodiment, the navigation system 20 automatically displays any images downloaded from the server 16 for each segment when the user and the navigation system reach the beginning of each segment while traveling along the route.

Figure 3:
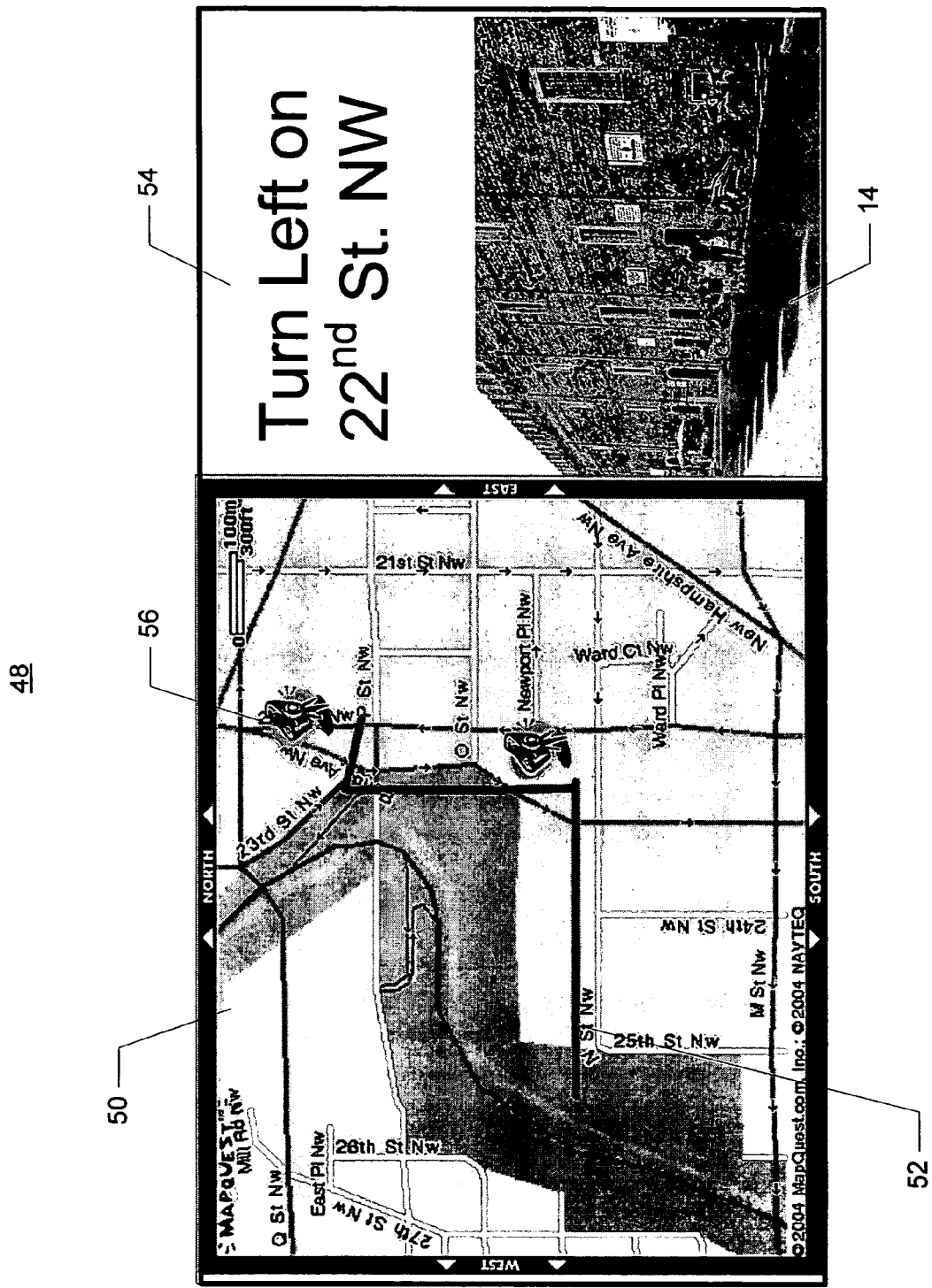
FIG. 3 is a diagram illustrating the user interface of the image-based navigation system in accordance with the present invention.

FIG. 3 is a diagram illustrating the user interface 48 of the image-based navigation system in accordance with the present invention. In a preferred embodiment, the navigation system 20 displays a map 50 of the route 52, instructions for each segment 54 of the route, and one or more images 14 associated each segment 54, if any. Icons for points of interest 56 in the general area of the route 52 may also be shown on the map 50, and each point of interest 56 may also have one or more images 14 associated with it.

In the example, the user is progressing toward his destination, and the navigation system 20 displays the segment "Turn left on $22^{nd}$ St. NW," as the user approaches that segment of the route 52. The navigation system 20 also displays the image 14 showing a scene that the user is likely to see after making a left onto the $22^{nd}$ St. The image 14 displayed may be default image chosen for that segment, or the image 14 may be one that most closely matches the current location of the navigation system 20. If a set of images is available for a particular segment, then a representative image from the set is displayed and the user can then choose to view the others in the set.

The purpose of the image 14 is to give the user a better feel for the scene as it unfolds around them. The purpose of image-based navigation is not just to get the X-Y coordinates correct, but also to help the user become familiar with and comfortable with the route. The usage of images 14 is essential for this purpose. The navigation tool becomes less and less important as the user becomes more and more familiar with his surroundings. This helps prevent the currently common problems where many people manage to get lost despite the use of a navigation system—typically, there can be some ambiguity especially for someone who is new to an area.

In a further aspect of the present invention, the metadata 36 may be displayed along with the images 14 to inform the user other points of interest along the user's route. This can help him choose alternative routes. Alternatively, as the user is progressing toward his destination, he may be shown images of interesting points along the way. For example, assume that an image 14 includes the following metadata annotation "From the corner of $8^{th}$ Avenue and $34^{th}$ Street in New York, one can see the Empire State Building at least a mile away and from Pier 61 (on $2^{nd}$ Avenue and $23^{rd}$ Street) you can see the Statue of Liberty across the water." In some cases, the image might indicate that the viewer might have to step around from the intersection to see the actual sight, which is why it helps to show the image and let the user decide if even a slight detour from the specified route is worthwhile. As another example, as the user approaches a correct location, he is shown one or more images 14 of that location. These images 14 may include metadata indicating, e.g., that they are about the entrance, or the front, or the back. Viewing these images 14 and their metadata 36 can help the user figure out where exactly he should be going.

In a further aspect of the present invention, the navigation system 20 displays a map with points of interest identified. In response to the user selecting one or more of these points, the images 14 corresponding to those locations are made available along with some or all of their metadata 36, which may include the location and the time at which the picture was taken. Thus potentially, the user can see pictures that were taken 10 minutes ago or an hour ago—so as to get a sense of the current scene at the given location that the user selects. This aspect requires that the image metadata 36 include the time and date of image capture. Such images 14 would be provided by people who are part of a community hosting the navigation directory service 18, for example, and upload their pictures to the community website as often as they conveniently can, possibly in real time. Other subscribers can request these pictures through the same service provider. The pictures are sorted by recency$_{[PM1]}$ so that the latest view of the given point of interest is shown first. Clearly, this works best for popular locations where many users keep uploading pictures.

Notice that when the user is at a given intersection having coordinates X, Y, the image database 22 may contain several images with matching X, Y location data. Each of the pictures, however, may have different heading and face in different directions, e.g., North, East, West, and South, respectively. If the user is traveling North through the intersections, then the image facing South will be of little use to the user. Therefore, according to a further aspect of the present invention, the server 16 must find not only the images that have matching X, Y location data, but where a subset of the images also have headings matching the user's current heading. Only the images matching these two criteria can be displayed to the user. The present invention provides two embodiments for displaying the set of matching images for each of the segments.

In one preferred embodiment, the navigation system 20 sends its current heading to the server 16 at the beginning of each segment along the route, and the server 16 only transmits those images for a segment that match the heading transmitted by the navigation system 20. In the second embodiment, the server 16 transmits the images found for all of the segments along the route to the navigation system 20, regardless of heading. The navigation system 20 then determines which of those images match the current heading and only displays the matching images for each segment.

The present invention will now be explained in further detail with respect to FIGS. 4-6, which are flow diagrams illustrating different processes for implementing image-based navigation by displaying the images associated with a route to the user in a preferred embodiment of the present invention.

Figure 4:
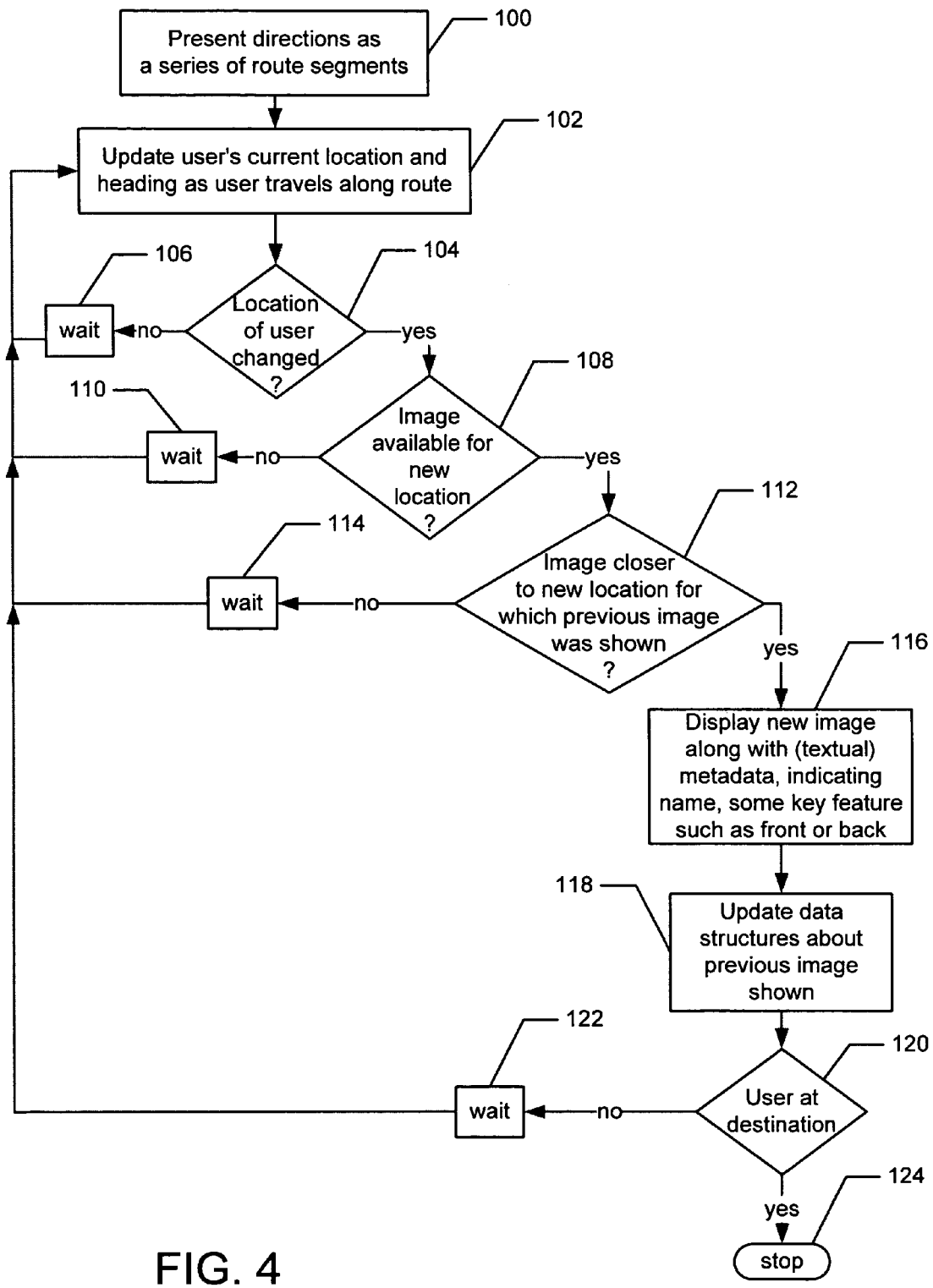
FIG. 4 is a flow diagram illustrating the process for updating the display of images while the user is traveling along the route provided by the directory service.

FIG. 4 is a flow diagram illustrating the process for updating the display of images while the user is traveling along the route provided by the directory service 18. The process begins in step 100 in which the navigation system 20 presents directions as a series of route segments. For example, a route may include a list of segments such as the following:

1. Walk down Via Verdi for 200 meters

2. Turn right on San Severino

3. Walk straight 100 meters

In step 102 as the user travels along the route, the user's current location and heading is updated. In step 104, it is determined if the user's location has changed. If not, the process waits in step 106 by continuing at step 102. If the user's location has changed, then in step 108, it is determined if an image 14 is available that matches the user's current location and heading. In a preferred embodiment, the location data 34 of the image 14 matches the user's current location if their difference is less than a predetermined threshold (e.g., 800 meters). If no image is available for the current location, then the process waits in step 110 by continuing at step 102.

If an image is available for the current location, then in step 112, it is determined if the current image 14 is closer to the user's current location for which a previous image 14 was shown, if any. If not, the process waits in step 114 by continuing at step 102. If the image is closer to the user's current location than the previous image, then in step 116 the image 14 is displayed along with its metadata 36 description. As stated above, if a set of images 14 are available for the current location, then a representative image 14 from the set is displayed in step 116. In step 118, the data structures about which image 14 was previously displayed is updated. In step 120, it is determined whether the user has reached the route's destination. If not, the process waits in step 122 by continuing at step 102. The process ends in step 124 once the user reaches the destination.

Figure 5:
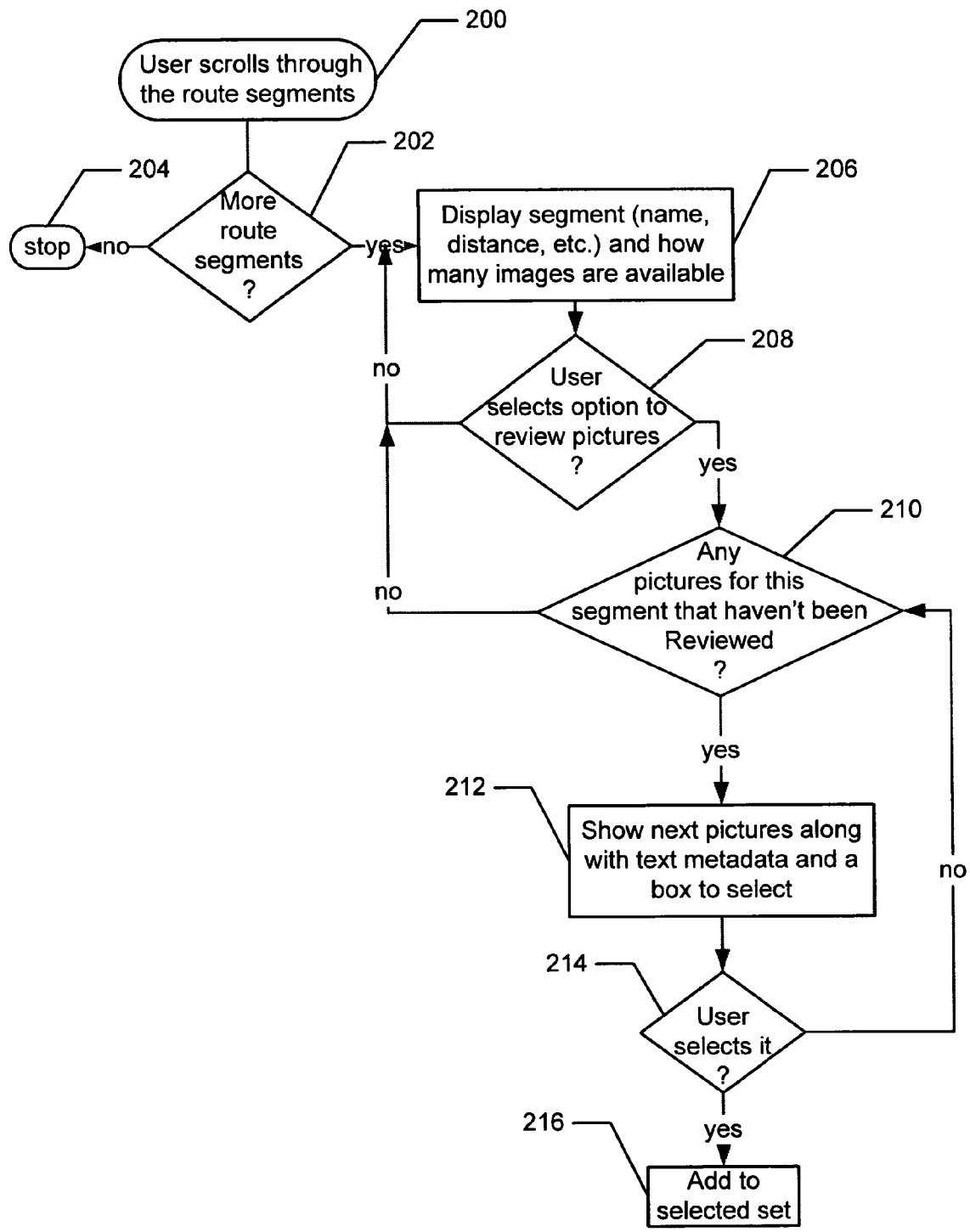
FIG. 5 is a flow diagram illustrating the process of enabling the user to preview upcoming segments of the route by accessing the images associated with the segments.

FIG. 5 is a flow diagram illustrating the process of enabling the user to preview upcoming segments of the route by accessing the images associated with the segments. In this embodiment, the navigation system 20 allows the user to cycle through the display of route segments and in response, indicates to the user whether images 14 are available for each segment. The user can then select the images that appear most interesting. The selected images are the ones that will be shown during the user's actual travel along the route.

The process begins in step 200 when the user scrolls through the route segments. If there are no more segments available for the route in step 202, then the process ends in step 204. If there are more segments, then in step 206 the navigation system 20 displays the next segment and indicates how many images 14 are available for that segment. In step 208, it is determined if the user selects an option to review the images 14. If the user selects the option to review the images 14, then in step 210, it is determined whether they are any images 14 for the current segment that have not been displayed. If the user does not select the option to review the images 14, or if there are no images 14 available for the segment, then the process continues at step 206.

If there are images 14 available for the current segment in step 210, then in step 212, the next available image is displayed along with its metadata 34 and a selection box to add the image 14 to the set of selected images 14 for the segment. If the user does not select the selection box, the process continues at step 210. If the user selects the selection box in step 214, then in step 216, the current image 14 is added to the selected set of images 14 for the current segment. At the end of the process, each segment will have a set of user selected images 14 that will be displayed automatically at the beginning of each segment as the user travels along the route.

As the look of intersections and roads may change rapidly due to changes in environment and weather, a further aspect of the present invention utilizes the user's current time and date to filter the set of available images for a segment such that only the images that have a time and date closely matching the user's current time and date are displayed to the user. This process ensures that the user is shown only images that are not stale and that will look as close as possible to the current conditions along the route that the user is traveling. This is accomplished by only displaying images for a segment that are sufficiently recent and were captured sufficiently close to the same time of day and season as the current time and date.

Figure 6:
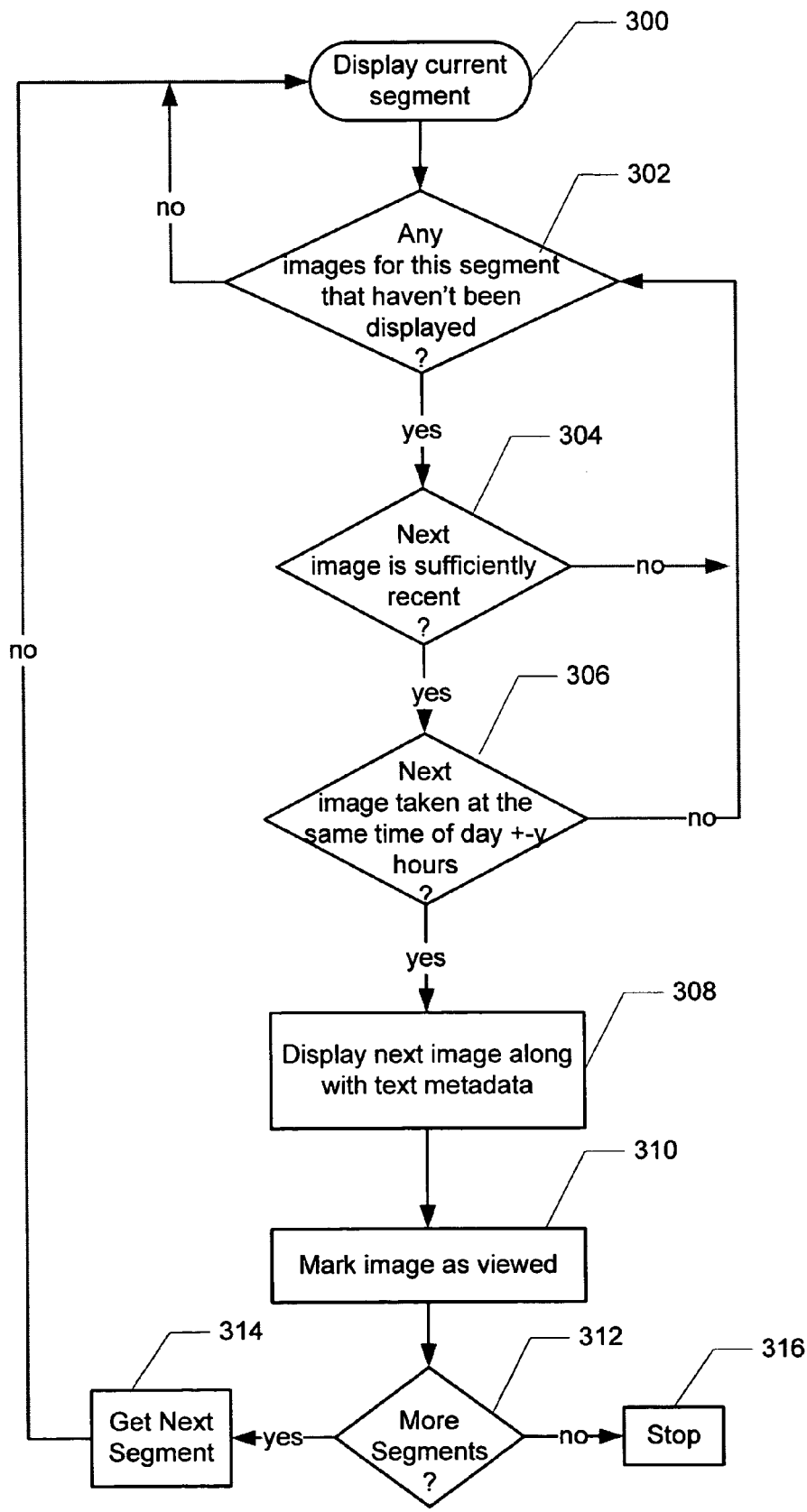
FIG. 6 is a flow diagram illustrating an embodiment in which the user's current conditions are used to determine which images in a set of available images for a segment are displayed to the user.

FIG. 6 is a flow diagram illustrating an embodiment in which the user's current conditions are used to determine which images in set of available images for a segment are displayed to the user. This process may be used when images 14 for the segment are automatically displayed to the user based on the user's location and heading, or in the embodiment where the user has previewed images for a segment and selected which of those images 14 are to be displayed when traveling from one segment to the next, as described in FIG. 5.

The process begins in step 300 when a current segment is displayed. It is determined in step 302 if there are any images 14 associated with the segment that have not yet been displayed. The purpose of the step is to keep track of which images 14 are shown to the user during a session so that the same images are not repeatedly displayed. If there are no images 14 that have not yet been displayed in step 302, then the process continues at step 300. If there are images 14 that have not have been displayed in step 302, then in step 304, it is determined whether the next image 14 is sufficiently recent by determining whether the date of the image is within a predetermined threshold of the current date (e.g., within 3 months). If the image 14 is not sufficiently recent, then the process continues at step 302.

If the image 14 is sufficiently recent, then in step 306, it is determined whether the image 14 was taken at the same time of day by determining if the time of image capture is within a predetermined threshold of the current time (e.g., within 6 hrs.) Alternatively, it can be determined if the image was taken at same time of day if the time of the capture and the current time fall with a common range of time of the day, such as morning (6 am-11:59 am), afternoon (12 pm-5:59), or night (6 pm-6 am). If the image 14 was not taken at the same time of day, then the process continues at step 302.

If the image 14 was taken at the same time of day, then in step 308 the image 14 is displayed along with its metadata 34. Alternatively, the image can be flagged to be displayed at a later time. In step 310, the image 14 is marked as viewed. In step 312, it is determined if there are more segments. If so, in step 314, the next segment is retrieved and the process continues at step 300. Otherwise, process ends in step 316.

A method and system for associating images with navigation has been disclosed. The present invention has been described in accordance with the embodiments shown, and one of ordinary skill in the art will readily recognize that there could be variations to the embodiments, and any variations would be within the spirit and scope of the present invention. Accordingly, many modifications may be made by one of ordinary skill in the art without departing from the spirit and scope of the appended claims.

I claim:

1. A method for providing an online image-based navigation directory service, comprising:

receiving by a server uploaded digital images, wherein each of the uploaded images is tagged with location data and metadata, wherein the location data specifies geographic coordinates of the image capture, and the metadata includes a time and date of the image capture and optionally user annotations describing the image;

storing the digital images in an image database that is indexed by the location data;

allowing a user of a navigation system to log into the server and to submit a request for directions that is wirelessly transmitted to the server;

in response to receiving the request for directions, accessing a map database and calculating directions for the route, including route segments;

for each segment identified along the route, searching the image database for any digital images that have location data that matches the location of the segment; and transmitting the set of images found for the directions from the server to the navigation system for display to the user along with the directions.

2. The method of claim 1 wherein the directions are provided to the user by displaying a map of the route along with the route segments, the method further including: when each of the route segments is displayed, also displaying any images associated with the corresponding route segment.

3. The method of claim 2 wherein when each of the images are displayed, displaying metadata corresponding to each image.

4. The method of claim 2 further including: allowing the user of the navigation system to cycle through the display of route segments and indicating to the user whether images are available for each segment.

5. The method of claim 2 further including: displaying the map of the route with points of interest identified, and in response to the user selecting one or more of these points, making any images corresponding to those locations available to the user.

6. The method of claim 2 further including: using the user's current time and date to filter a set of available images for a segment such that only the images that have a time and date matching the user's current time and date within a predetermined threshold are displayed to the user.

7. The method of claim 1 wherein the navigation system sends its current heading to the server at a beginning of each segment along the route, and the server only transmits those images for a segment that match the heading transmitted by the navigation system.

8. The method of claim 1 wherein the server transmits the images found for all of the segments along the route to the navigation system, regardless of heading, and the navigation system determines which of those images match a current heading of the navigation system and only displays the matching images for each segment.

9. The method of claim 1 further including: requiring that the location data uploaded with the digital images include a heading indicating a direction of view of the image.

10. The method of claim 9 wherein the location data comprises GPS data.

11. The method of claim 9 wherein the location data comprises a manually entered street address and a direction of view from a user of an image capture device.

12. The method of claim 1 wherein the request includes a current heading of the navigation system, the method further including: searching the image database for digital images that have both location data and a heading that matches the location and the heading of the navigation system.

13. The method of claim 12 further including: charging the user of the navigation system a fee for use of the image-based navigation directory service.

14. An image-based navigation system, comprising:
at least one server;
an image database for storing digital images uploaded from image capture devices to the server, wherein each of the uploaded images is tagged with location data and metadata, the location data specifies geographic coordinates of the image capture, the metadata includes a time and date of the image capture and optionally user annotations describing the image, and the image database is indexed by the location data; and
a map database for storing map and directions data;
wherein the server is configured to perform functions for
receiving a request for directions from a user of a navigation system,
in response to receiving the request for directions, accessing the map database to calculate directions based on the request, wherein the directions include one or more route segments;
searching the image database for any digital images that have location data that match locations of the route segments; and
returning the route segments and corresponding images found to the navigation system for display along with the directions.

15. The system of claim 14 wherein the request includes a current heading of the navigation system, the server further configured to: search the image database for digital images that have both location data and a heading that matches the location and the heading of the navigation system.

16. The system of claim 14 wherein the image-based navigation system further includes a user account database for storing user account information; such that when the user request for directions is received, the user is validated in the account database.

17. A method for operating a navigation system comprising:
enabling a user to submit a request for directions;
transmitting the request to an online navigation directory service for processing the request;
receiving the directions from the online navigation directory service, wherein the directions include one or more route segments and at least one digital image uploaded from an image capture device to the navigation directory service, the at least one digital image tagged with location data and metadata, the location data specifying geographic coordinates of the image capture, the metadata including a time and date of the image capture and optionally user annotations describing the image, and the at least one digital image has location data that matches a location of at least one of the route segments; and
displaying the directions to the user by sequentially displaying the route segments along with any images having location data that matches the locations of the route segments.

18. A computer readable medium containing programming instructions, executable by a machine, for providing image-based navigation, the instructions for:
receiving by a server uploaded digital images, wherein each of the uploaded images is tagged with location data and metadata, wherein the location data specifies geographic coordinates of the image capture, and the metadata includes a time and date of the image capture and optionally user annotations describing the image;
storing the digital images in an image database that is indexed by the location data;
allowing a user of a navigation system to log into the server and to submit a request for directions that is wirelessly transmitted to the server;
in response to receiving the request for directions, accessing a map database and calculating directions for the route, including route segments;
for each segment identified along the route, searching the image database for any digital images that have location data that matches the location of the segment; and
transmitting the set of images found for the directions from the server to the navigation system for display to the user along with the directions.

19. The computer readable medium of claim 18 wherein the directions are provided to the user by displaying a map of the route along with the route segments, the computer readable medium further including instructions for: when each of the route segments is displayed, also displaying any images associated with the corresponding route segment.

20. The computer readable medium of claim 18 including instructions for when each of the images are displayed, displaying metadata corresponding to each image.

21. The computer readable medium of claim 18 further including instructions for: allowing the user of the navigation system to cycle through the display of route segments and indicating to the user whether images are available for each segment.

22. The computer readable medium of claim 18 further including instructions for: displaying the map of the route with points of interest identified, and in response to the user selecting one or more of these points, making any images corresponding to those locations available to the user.

23. The computer readable medium of claim 18 further including instructions for: using the user's current time and date to filter a set of available images for a segment such that only the images that have a time and date matching the user's current time and date within a predetermined threshold are displayed to the user.

24. The computer readable medium of claim 18 further including instructions for: searching the image database for digital images that have both location data and a heading that matches a location of the segment and the heading of the navigation system.

25. The computer readable medium of claim 18 including instructions for the navigation system sending its current heading to the server at a beginning of each segment along the route, and instructions for the server only transmitting those images for a segment that match the heading transmitted by the navigation system.

26. The computer readable medium of claim 18 including instructions for the server transmitting the images found for all of the segments along the route to the navigation system, regardless of heading, and instructions for the navigation system determining which of those images match a current heading of the navigation system and only displaying the matching images for each segment.

27. The computer readable medium of claim 18 further including instructions for: requiring that the location data uploaded with the digital images include a heading indicating a direction of view of the image.

28. The computer readable medium of claim 27 wherein the location data comprises GPS data.

29. The computer readable medium of claim 27 wherein the location data comprises a manually entered street address and a direction of view from a user of an image capture device.

* * * * *